3,215,650
PRODUCTION OF FOAMED RESINS

Anatole Julius, Paris, René Peters, Neuilly, and François de Lichtenberg, Paris, France, assignors to Societe Anonyme Peltex, Saint-Dié, France, a corporation of France
No Drawing. Filed May 16, 1962, Ser. No. 195,306
Claims priority, application France, May 24, 1961, 862,622
5 Claims. (Cl. 260—2.5)

The invention relates to a process for the production of cellular masses of polymerizable resins, and to the cellular masses produced by the process It is already known to obtain cellular masses of phenolic resin, by adding a blowing agent, which is capable of evolving a gas upon reaction with an acid, the reaction setting the resin simultaneously with the foaming. However, this reaction is uncontrollable and uncontrolled, the reaction, between the blowing agent, such as a carbonate, and the acid being set up immediately at the region where the acid is added and giving bubbles, the cavities resulting from which are variable in size and spacing. Moreover, the acid gives rise to hardening by polymerization of the phenolic resin with a local increase in the viscosity of the medium. It has also been proposed to use cellulose acetobutyrate in such a process in order to obtain a more uniform foam. The process modified in this way does not give a satisfactory result, since the second constituent of the reaction, that is the acid, which controls the foaming and hardening is subject to mass introduction in one portion of the reaction mixture and starts reacting immediately.

Making cellular masses of polymerizable resins has special problems. It is in effect necessary to initiate foaming by ensuring a generation of gas which is uniformly distributed throughout the mass, and to avoid a localised, or premature polymerization (either from the setting action of the acid used to react with the basic salt in a gas-generating reaction, or because of the evolution of heat by virtue of the exothermic nature of the reactions).

The process according to the invention for the production of cellular masses of polymerizable resins consists in making up an anhydrous liquid mixture of a polymerizable resin with reactants which are soluble or dispersable in the said liquid mixture and capable of evolving gas in the presence of water, and adding water immediately before shaping the mass.

The process according to the invention permits of making a perfectly homogeneous thorough mixture without the fear of premature starting of the reaction, and with a uniform distribution of the substances giving the gas-evolving reaction such as it has not hitherto been possible to obtain with polymerizable resins.

The polymerizable resins capable of being used in the process according to the invention may be unsaturated polyesters, acrylic resins, urea-formaldehyde resins, melamines resins, phenolic resins, etc.

The reactants capable of evolving gas in the presence of water are made up of a mixture of at least one salt the anhydride of which is gaseous and replaceable by an acid and at least one anhydride of an acid able to replace that of the salt. Carbonates, bicarbonates, nitrates, or nitrites (for example calcium carbonate, urea nitrite etc.) may be used as salts. Any one of those acid anhydrides which are dispersable in the resins or their solvents, and preferably the soluble ones may be used as the anhydride. Examples of these anhydrides are maleic anhydride, phthalic anhydride, fumaric anhydride, pyromucic anhydride, etc.

To control the speed of the reaction and according to a second characteristic of the process, the water is introduced as an aqueous emulsion of a thermoplastic resin. The introduction of water in this form checks the acid-forming reaction, since the emulsified resin, on the one hand, forms a shield for the hydration and on the other hand absorbs the heat evolved by the reaction and it is possible, by varying the water content of the emulsion to alter the speed of the reaction. The emulsion may be, for example, an aqueous emulsion of styrene-butadiene or of vinylidene resin, or of vinyl or acrylic resins. Moreover, the reaction described above may be enhanced by adding to the emulsion alcohols and diols such as glycerines, sorbitols, glycols, etc.

To improve the cellular structure of the mass obtained, the phenomenon of thixotropic viscosity is used. Thixotropic viscosity—false viscosity—is high when the material is at rest and low when it is being moved or agitated. It accordingly allows the bubbles of gas which form the cells to move easily while the mass is being stirred up by the evolution of gas while the bubbles become fixed when the reaction stops. The naturally viscous resins expand badly, having too much resistance to the rising up of the gas. According to an improvement of the process according to the invention, the viscosity is altered by adding a viscosity modifier, consisting of organometallic compounds or soaps such as aluminum naphthenate, aluminum heptanoate or certain complex silicates, or of a thermoplastic resin such as ethyl cellulose, benzyl cellulose, vinyl or acrylic resins, cellulose acetobutyrate, etc. to the mixture. Addition of water in the form of an emulsion of a thermoplastic resin gives a local change in thixotropy, at the point where the water is added, upon reaction with the gas-evolving reactant.

Moreover, it is preferable to act equally upon the thixotropic viscosity of the liquid mixture of resin and reactive substance by adding the modifiers to the liquid mass itself.

The cellular structure is still further improved by addition of those viscosity modifiers which control the reaction and the setting by taking part in wall formation. Moreover, those non-polymerizable substances—thermoplastics generally dissolved in the resin or its solvents—absorb the heat evolved during the reaction and reduce the viscosity of the mixture when warm and accordingly control the polymerization by hindering premature setting of the gel.

The process according to the invention finally allows for organic or inorganic fillers such as kaolin, kieselguhr, lycopodium powder, wood flour, cork powder and various fibers (these fibers reinforcing the mass mechanically) to be introduced into the cellular mass.

The process of preparation according to the invention consists in: preparing an anhydrous homogeneous liquid mixture of a polymerizable resin with reagents capable of evolving gas, and, optionally with at least one substance for modifying the thixotropic viscosity, by energetic stirring; preparing a polymerization catalyst; preparing aqueous emulsion of a thermoplastic resin; adding first the polymerization catalyst and then the aqueous emulsion to the anhydrous mixture of polymerizable resin with vigorous stirring; and pouring the resulting mixture into a mold.

If the reaction conditions or nature of the resin necessitates a polymerization accelerator, this is added to the aqueous dispersion of resin, or added to the mass after dispersion.

After being turned out of the mould the mass is dried to rid it of volatile substances.

In the known processes, the expansion of the resin is generally random, uncontrollable and uncontrolled.

The process according to the invention allows for control over the reaction and over the cell formation process, over diameter of cells, over whether they are communicating or not communicating, and over the coefficient of expansion.

The cellular masses prepared by the process according to the invention may be made up from the composition indicated in the following examples, the proportion given in which may vary and which are only to be understood in a non-limiting fashion.

*Example 1*

The various stages of the process are hereafter described as:

A. Preparation of anhydrous mixture of polymerizable resin with reagents capable of evolving gas,
B. Preparation of catalyst mixture,
C. Preparation of aqueous emulsion,
A. The following constituents are mixed:

110 g. of flexible polyester resin,
880 g. of rigid polyester resin of high modulus of elasticity,
150 g. of vinyl resin (vinyl acetochloride),
200 g. of maleic anhydride are dissolved in this mixture by heating it to 40–45° C. The maleic anhydride should be added as a very fine impalpable powder,
330 g. of calcium carbonate are added to the above, and should be carefully stirred in a mixer in order to obtain a completely homogeneous mixture and as uniform a distribution of calcium carbonate as possible.

B. 13 g. of a catalyst, consisting of a 65% paste of benzoyl peroxide in triscresylphosphate, are prepared separately. This peroxide should be dissolved in 80 g. of low-viscosity polyester resin.

C. A mixture of:

330 cm.$^3$ of water,
130 cm.$^3$ of glycerine,
75 cm.$^3$ of a styrene-butadiene resin emulsion,
1.4 cm.$^3$ of an accelerator such as dimethylaniline was prepared separately.

The mixtures A and C should be heated separately at 55° C. to accelerate the subsequent reaction, and should be held at the same temperature throughout the reaction, whatever the ambient conditions are.

The catalyst B is added to mixture A, stirred vigorously (by a turbine or some other stirring means) and mixture C is added. The stirring is continued for 12 to 15 seconds. The mixture thereupon starts to foam and should be immediately poured into a prepared mould which has been treated so as to avoid any sticking.

The cellular mass obtained polymerizes in 3 to 5 minutes. It may be taken from the mould after 20 minutes. To obtain perfectly dry cellular mass, an evaporation of all the remaining volatile substances (water, styrene, etc.) is carried out. This may be done in a ventilated or pulsed air dryer held at a temperature of about 80° C.

The product obtained was 13.5 liters of a foam of specific gravity 0.11, with 22-fold expansion reckoned on the basis of resin or 9.9 fold expansion reckoned on the basis of total mass.

*Example 2*

Stages A, B and C were carried out with constituents and proportion as follows:

A. 1400 g. of semi-rigid polyester resin,
150 g. of maleic anhydride,
300 g. of calcium carbonate,
50 g. of cellulose acetobutyrate.
B. 12 g. of catalyst (benzoyl peroxide in 60–65% concentration in tricresylphosphate).
C. 330 cm.$^3$ of water,
1.7 cm.$^3$ of dimethylaniline,
110 cm.$^3$ of glycerine.

A very light product of 14-fold expansion over the total weight and 20-fold expansion with regard to resin content, was obtained.

*Example 3*

Stages A, B and C were carried out with constituents and proportions as follows:

A. 300 g. of semi-rigid polyester resin,
260 g. of flexible polyester resin,
900 g. of rigid polyester resin,
200 g. of calcium carbonate,
130 g. of maleic anhydride,
150 g. of vinyl acetate,
90 g. of sisal or glass fibers,
100 g. of boric acid (flame resistant filler),
50 g. of antimony oxide (flame resistant filler),
B. 12 g. of catalyst (60–65% benzoyl peroxide in tricresylphosphate),
C. 240 cm.$^3$ of water,
100 cm.$^3$ of propylene glycol,
1.8 cm.$^3$ of dimethylaniline.

A product which is self-extinguishing (i.e. a non-ignitable product) by virtue of the flame resistant filler, and which is reinforced by the fibers, is obtained, having a 5.13-fold expansion based on the overall weight, and a 9-fold expansion based on the weight of resin.

In this example the following proportions and constituents were used:

*Example 4*

In this example the following proportions and constituents were used:
A. 20 kg. of rigid polyester resin,
2 kg. of maleic anhydride,
3 kg. of calcium carbonate,
1 kg. of cellulose acetobutyrate, 26 kg. a volume of 21.70 liters.

B. 160 g. of catalyst (60–65% of benzoyl peroxide in triscresylphosphate),
430 g. of styrene,
430 g. of flexible polyester resin,
C. 2.8 liters of water,
24 cm.$^3$ of dimethylaniline,
24 cm.$^3$ of acetic acid.

Various modifications may be made in the details of carrying out the process described, either with regard to the constituents used, to the proportions of these constituents, or to the order in which the various steps are carried out, without departing from the scope of the invention as defined in the appended claims.

What we claim is:

1. A process for the production of cellular masses of polymer resin by evolution of gas within the mass before and during polymerization, which polymer resin is characterized by evolution of heat during the polymerization, which comprises preparing an anhydrous liquid mixture of the resin to be polymerized with a salt having a gaseous anhydride and an anhydride of an acid capable of replacing the anhydride of the salt, and adding to the mixture a dispersion of a thermoplastic resin in water which thermoplastic resin is different from said polymer resin.

2. A process as claimed in claim 1, in which said resin to be polymerized is a polyester resin.

3. A process as claimed in claim 1, and adding a polymerization catalyst to said anhydrous mixture prior to addition of said dispersion.

4. A process as claimed in claim 1, in which said salt is selected from the class consisting of carbonates, bicarbonates, nitrates and nitrites, and said anhydride is selected from the class consisting of maleic, phthalic, fumaric and pyromucic anhydrides, and said thermoplastic resin is selected from the class consisting of ethyl cellulose, benzyl cellulose, cellulose acetobutyrate, vinyl resins and acrylic resins.

5. A process as claimed in claim 1, in which said resin to be polymerized is polyester resin, said dispersed resin is styrene-butadiene resin, said salt is calcium carbonate, and said anhydride of an acid is maleic anhydride.

References Cited by the Examiner

UNITED STATES PATENTS

| | | | |
|---|---|---|---|
| 2,461,761 | 2/49 | Nye | 260—2.5 |
| 2,491,409 | 12/49 | Kropa et al. | 260—2.5 |
| 2,514,141 | 7/50 | Phillips | 260—2.5 |
| 2,529,512 | 11/50 | Ott | 260—2.5 |
| 2,576,073 | 11/51 | Kropa et al. | 260—2.5 |

FOREIGN PATENTS 652,770  5/51  Great Britain.

SAMUEL H. BLECH, *Primary Examiner.*

LEON J. BERCOVITZ, MURRAY TILLMAN,
*Examiners.*